US012035709B2

(12) United States Patent
Weber et al.

(10) Patent No.: US 12,035,709 B2
(45) Date of Patent: Jul. 16, 2024

(54) SYSTEMS AND METHODS FOR THAWING CELLS USING MAGNETIC PARTICLES

(71) Applicant: Boston Scientific Scimed, Inc., Maple Grove, MN (US)

(72) Inventors: Jan Weber, Maastricht (NL); Megan Chrobak, Groton, MA (US); Carolina Villarreal, Hopedale, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 566 days.

(21) Appl. No.: 16/551,998

(22) Filed: Aug. 27, 2019

(65) Prior Publication Data

US 2020/0068876 A1 Mar. 5, 2020

Related U.S. Application Data (60) Provisional application No. 62/723,682, filed on Aug. 28, 2018.

(51) Int. Cl.
*A01N 1/02* (2006.01)
(52) U.S. Cl.
CPC ......... *A01N 1/0294* (2013.01); *A01N 1/0221* (2013.01)
(58) Field of Classification Search
CPC .................. A01N 1/0294; A01N 1/0221
See application file for complete search history.

(56) References Cited

U.S. PATENT DOCUMENTS

| 2003/0163187 | A1 | 8/2003 | Weber | |
|---|---|---|---|---|
| 2004/0210289 | A1* | 10/2004 | Wang | B82Y 25/00 |
| | | | | 607/116 |
| 2011/0311822 | A1* | 12/2011 | Hao | B82Y 30/00 |
| | | | | 427/213.3 |

(Continued)

FOREIGN PATENT DOCUMENTS

| JP | 2017517494 | * | 6/2017 | |
|---|---|---|---|---|
| WO | WO-2014143961 A1 | * | 9/2014 | ........... A01N 1/0221 |
| WO | 2016090310 | | 6/2016 | |

(Continued)

OTHER PUBLICATIONS

Etheridge et al. "RF heating of magnetic nanoparticles improves the thawing of cryopreserved biomaterials" Technology vol. 2, No. 3, Sep. 2014 (Year: 2014).*

(Continued)

*Primary Examiner* — Blaine Lankford
*Assistant Examiner* — Lauren K Van Buren
(74) *Attorney, Agent, or Firm* — Pauly, DeVries Smith & Deffner LLC (57) ABSTRACT

Embodiments herein relate to systems and methods for thawing cells using magnetic particles, such as Curie-magnetic or Néel-magnetic particles. In an embodiment, a cell storage medium for cryopreservation is included. The cell storage medium can include a cryoprotective agent; and a plurality of particles comprising a magnetic material. In an embodiment, a method for thawing a frozen cell sample is included. The method can include obtaining a frozen cell sample comprising particles, the particles comprising a magnetic material and applying an alternating electromagnetic field to the frozen cell sample to induce heating of the magnetic material. Other embodiments are also included herein.

10 Claims, 9 Drawing Sheets

(56) References Cited

U.S. PATENT DOCUMENTS

2015/0297763 A1  10/2015  Sutermeister et al.

FOREIGN PATENT DOCUMENTS

| WO | 2017143162 | 8/2017 |
| WO | 2020046872 | 3/2020 |

OTHER PUBLICATIONS https://www2.oberlin.edu/physics/catalog/demonstrations/em/gadolinium.htm (Year: 2023).*

Hachani et al. "Tracking stem cells in tissue-engineered organs using magnetic nanoparticles" Nanoscale, 2013, 5, 11362-11373 (Year: 2013).*

Ortega-Berlanga et al. "An Overview of Gadolinium-Based Oxide and Oxysulfide Particles: Synthesis, Properties, and Biomedical Applications" Crystals 2021, 11, 1094 (Year: 2021).*

Cambridge Dictionary Definitions (Year: 2023).*

"International Preliminary Report on Patentability," for PCT Application No. PCT/US2019/048252 mailed Mar. 11, 2021 (7 pages).

International Search Report and Written Opinion for PCT Application No. PCT/US2019/048252 mailed Nov. 8, 2019 (10 pages).

Etheridge, Michael, L. et al. "RF heating of magnetic nanoparticles improves the thawing of cryopreserved biomaterials," Technology, vol. 2, No. 3, Sep. 2014 (14 pages).

"Cryopreservation and Freeze-Drying Protocols," Second Edition Methods in Molecular Biology edited by John G. Day and Glyn N. Stacey, 2007 (360 pages).

Gleiter, Herbert "Nanoglasses: a new kind of noncrystalline materials," Beilstein Journal of Nanotechnology 2013, 4, 517-533 (17 pages).

Herynek, Vit et al., "Using ferromagnetic nanoparticles with low Curie temperature for magnetic resonance imaging-guided thermoablation," International Journal of Nanomedicine 2016:11 3801-3811 (11 pages).

Rahman, M. M. et al., "Composition, Termperature an dFrequency Dependent Magnetic, Dielectric and Electrical Properties of Magnesium-Zinc Ferrites," Journal of Bangladesh Academy of Sciences, vol. 36, No. 2, 199-212, 2012 (14 pages).

Todaka, T. et al., "Low Curie temperature material for induction heating self-temperature controlling system," Journal of magnetism and magnetic material 320(2008) e702-e707 (6 pages).

Tucek, Jiri et al., "Room Temperature Organic Magnets Derived from sp3 Functionalized Graphene," Nature Communications 8:14525 Published Feb. 20, 2017 (12 pages).

Zhao, Hong J. et al., "Near room-temperature multiferroic materials with tunable ferromagntic and electrical properties," Nature Communications 5:4021, Published May 28, 2014 (7 pages).

"Response to Communication Pursuant to Rules 161(1) and 162 EPC," for European Patent Application No. 19765604.4 filed Oct. 13, 2021 (8 pages).

"Communication Pursuant to Article 94(3) EPC," for European Patent Application No. 19765604.4 mailed May 22, 2023 (6 pages).

"Response to Communication Pursuant to Article 94(3) EPC," for European Patent Application No. 19765604.4 filed Sep. 21, 2023 (9 pages).

* cited by examiner

SYSTEMS AND METHODS FOR THAWING CELLS USING MAGNETIC PARTICLES

This application claims the benefit of U.S. Provisional Application No. 62/723,682, filed Aug. 28, 2018, the content of which is herein incorporated by reference in its entirety.

FIELD

Embodiments herein relate to systems and methods for thawing cells using magnetic particles. In particular, embodiments herein related to systems and methods for thawing cells using Curie-magnetic or Néel-magnetic particles.

BACKGROUND

Cells can be preserved for future use by isolating them from an animal or a cell culture sample and freezing them. Cells can be frozen using cryoprotectant compounds in a cell freezing medium to prevent formation of ice crystals during the freezing and thawing process.

The process of thawing a frozen cell sample can introduce mechanical stress on the cells. Thawing processes can also result in an uneven distribution of temperatures from the exterior of the cell sample to the interior of the cell sample, thus overheating some cells within the population while others remain frozen. As a result, the freezing and thawing of cells can be a stressful process that can affect cell viability and long-term health. For example, the mechanical and chemical stresses experienced by frozen cells during freezing and thawing can trigger apoptotic pathways, eventually leading to cell death.

SUMMARY

Various aspects are included herein. In a first aspect, a cell storage medium for cryopreservation is included. The cell storage medium can include a cryoprotective agent and a plurality of particles comprising a magnetic material.

In a second aspect, in addition to one or more of the preceding or following aspects, or in the alternative to some aspects, the magnetic material can include a ferromagnetic, paramagnetic, ferrimagnetic, or anti-ferromagnetic material.

In a third aspect, in addition to one or more of the preceding or following aspects, or in the alternative to some aspects, the ferromagnetic or paramagnetic material can include a Curie-magnetic material having a Curie temperature.

In a fourth aspect, in addition to one or more of the preceding or following aspects, or in the alternative to some aspects, the Curie-magnetic material can have a weight average Curie temperature of 10 degrees Celsius to 400 degrees Celsius, or from 10 degrees Celsius to 45 degrees Celsius.

In a fifth aspect, in addition to one or more of the preceding or following aspects, or in the alternative to some aspects, the ferrimagnetic or anti-ferromagnetic material can be a Néel-magnetic material having a Néel temperature.

In a sixth aspect, in addition to one or more of the preceding or following aspects, or in the alternative to some aspects, the Néel-magnetic material can have a weight average Néel temperature of 10 degrees Celsius to 400 degrees Celsius, or from 10 degrees Celsius to 45 degrees Celsius.

In a seventh aspect, in addition to one or more of the preceding or following aspects, or in the alternative to some aspects, the magnetic material can include gadolinium, chromium (IV) oxide, iron (III) oxide, cerium, praseodymium, lanthanum, samarium, erbium, nickel, manganese, dysprosium, yttrium, samarium-cobalt magnet, terfenol-D, magnetite, graphene, nanoglasses, or any alloys or derivatives thereof.

In an eighth aspect, in addition to one or more of the preceding or following aspects, or in the alternative to some aspects, the particles can be hollow.

In a ninth aspect, in addition to one or more of the preceding or following aspects, or in the alternative to some aspects, the hollow particles can include an outer shell and the magnetic material can be coated onto an outside surface of the outer shell.

In a tenth aspect, in addition to one or more of the preceding or following aspects, or in the alternative to some aspects, the particles can include two distinct regions, wherein one of the two regions has a density lower than 1 g/cm3.

In an eleventh aspect, a method for thawing a frozen cell sample is included. The method can include obtaining a frozen cell sample comprising particles, the particles comprising a magnetic material and applying an alternating electromagnetic field to the frozen cell sample to induce heating of the magnetic material.

In a twelfth aspect, in addition to one or more of the preceding or following aspects, or in the alternative to some aspects, the frozen cell sample can include stem cells.

In a thirteenth aspect, in addition to one or more of the preceding or following aspects, or in the alternative to some aspects, the magnetic material can include a ferromagnetic, paramagnetic, ferrimagnetic, or anti-ferromagnetic material.

In a fourteenth aspect, in addition to one or more of the preceding or following aspects, or in the alternative to some aspects, the magnetic material can include gadolinium, chromium (IV) oxide, iron (III) oxide, cerium, praseodymium, lanthanum, samarium, erbium, nickel, manganese, dysprosium, yttrium, samarium-cobalt magnet, terfenol-D, magnetite, graphene, nanoglasses, or any alloys or derivatives thereof.

In a fifteenth aspect, in addition to one or more of the preceding or following aspects, or in the alternative to some aspects, the particles can be hollow.

In a sixteenth aspect, in addition to one or more of the preceding or following aspects, or in the alternative to some aspects, the hollow particles can include an outer shell, and a magnetic material can be coated onto an outside surface of the outer shell.

In a seventeenth aspect, in addition to one or more of the preceding or following aspects, or in the alternative to some aspects, the particles can include two distinct regions, wherein one of the two regions has a density lower than 1 g/cm3.

In an eighteenth aspect, a frozen cell sample is included. The frozen cell sample can include a plurality of cells, a cell storage medium, the cell storage medium comprising a cryoprotective agent, and a plurality of particles comprising a magnetic material.

In a nineteenth aspect, in addition to one or more of the preceding or following aspects, or in the alternative to some aspects, the frozen cell sample can include stem cells.

In a twentieth aspect, in addition to one or more of the preceding or following aspects, or in the alternative to some aspects, the magnetic material can include gadolinium, chromium (IV) oxide, iron (III) oxide, cerium, praseodymium, lanthanum, samarium, erbium, nickel, manganese, dysprosium, yttrium, samarium-cobalt magnet, terfenol-D, magnetite, graphene, nanoglasses, or any alloys or derivatives thereof.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

Reducing or mitigating mechanical and chemical stress during the freezing and thawing of cells can protect cell viability and cell function. In accordance with various embodiments herein, a volumetric heating/thawing approach can be taken that can reduce the likelihood that some cells, particularly those on or near the outside of the frozen sample, will be overheated. Volumetric heating of a frozen cell sample herein is a mechanism whereby heat energy can be more uniformly distributed throughout the cell sample so that cells can be quickly transitioned from a frozen state to a thawed state substantially uniformly throughout the cell sample. Another aspect that can prevent the overheating of some cells is the ability to reduce the heat energy being applied to the cells once they hit a specific temperature or temperature range. In accordance with various embodiments herein, volumetric heating throughout a cell sample can be accomplished simultaneously with providing a mechanism to reduce heat energy after a target temperature is reached by exploiting the Curie-magnetic properties and/or Néel-magnetic properties of magnetic materials.

Magnetic materials that exhibit Curie-magnetic properties include those that have a characteristic Curie Temperature ($T_{Curie}$). $T_{Curie}$ is the temperature at which certain magnetic materials undergo a sharp change in their magnetic properties. Above the $T_{Curie}$, they are no longer magnetic and lose their capacity to heat in alternating magnetic fields. Likewise, the similar effect is observed for magnetic materials that exhibit Néel-magnetic properties, which include those that have a characteristic Néel-Temperature ($T_{Néel}$). Above the $T_{Néel}$, they begin to lose their magnetic properties and lose their capacity to heat in alternating magnetic fields.

The unique properties of Curie-magnetic materials and Néel-magnetic materials can be used to make particles that can be efficiently heated to a predetermined target temperature or temperature range, but with less risk of overheating. The particles can be distributed throughout a cell freezing medium to induce faster heating within a controlled range of temperatures. In general, the higher the surface area of the combined particles and the shorter the average distance between the cells and the heating elements within a cell sample, the more rapid heating can be.

Figure 1:
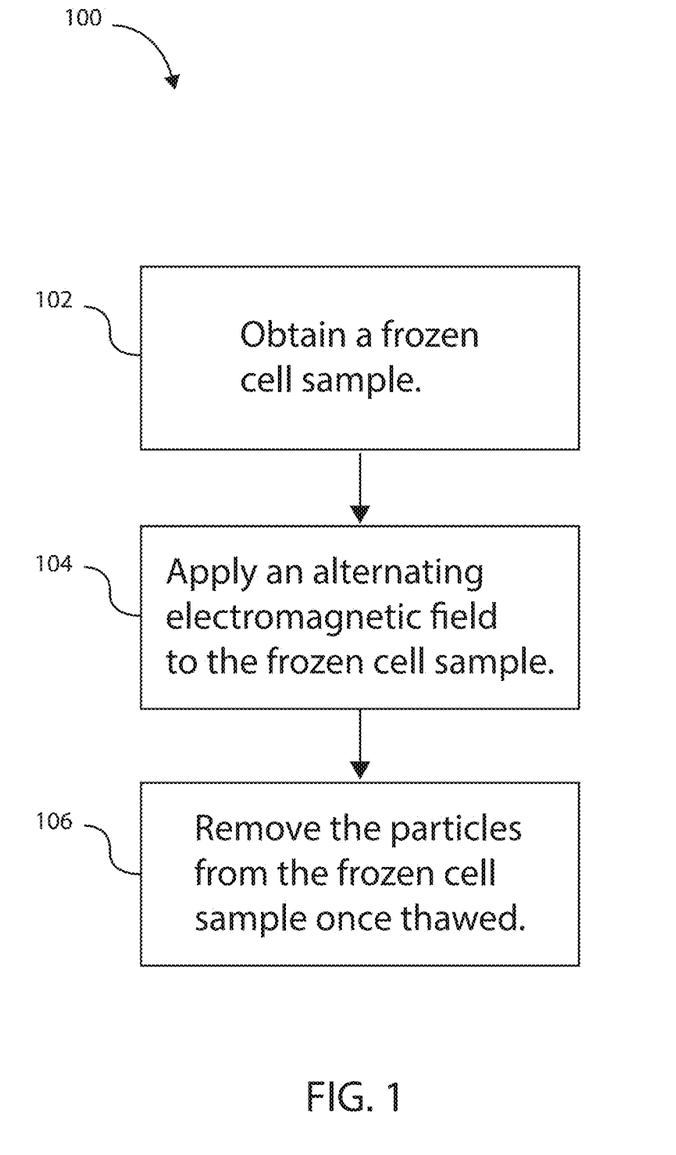
FIG. 1 is a schematic view of a method for thawing cells in accordance with various embodiments herein.

Referring now to FIG. 1, a schematic view of a method 100 for thawing cells is shown in accordance with the embodiments herein. The method 100 can include an operation of obtaining a frozen cell sample including particles, where the particles include a magnetic material at 102. In some embodiments, the frozen cell sample can specifically include stem cells. The stem cells can include many stem cell types, including, but not limited to, hematopoietic stem cells and/or mesenchymal stem cells. It will be appreciated, however, that embodiments herein can also be applied to other types of cell samples as well as other frozen materials such as non-cellular biological and non-biological materials.

The method 100 can include applying an alternating electromagnetic field to the frozen cell sample to induce heating of the magnetic material at 104. The electromagnetic field can be applied for various lengths of time. In some embodiments, the electromagnetic field can be applied for 10 seconds, 15 seconds, 30 seconds, 45 seconds, 1 minute, 2 minutes, 3 minutes, 4 minutes, 5 minutes, 8 minutes, 10 minutes, 15 minutes or longer. In some embodiments, the electromagnetic field can be applied for a length of time falling within a range between any of the foregoing. In some embodiments, the method 100 can also include removing the particles from the frozen cell sample once it is thawed at 106. In some embodiments, the particles suitable for use include a hollow portion, as will be discussed in more detail below.

Magnetic materials suitable for use herein can include, but not be limited to ferromagnetic, paramagnetic, ferrimagnetic, or anti-ferromagnetic materials. In some embodiments suitable magnetic materials can include organic magnetic materials such as graphene-based organic magnets. Other suitable magnetic materials can include nanoglasses. Magnetic materials herein can specifically include those exhibiting a characteristic Curie Temperature ($T_{Curie}$) and/or a characteristic Néel-Temperature ($T_{Néel}$). Magnetic materials suitable for use herein will be discussed in more detail below.

Figure 2:
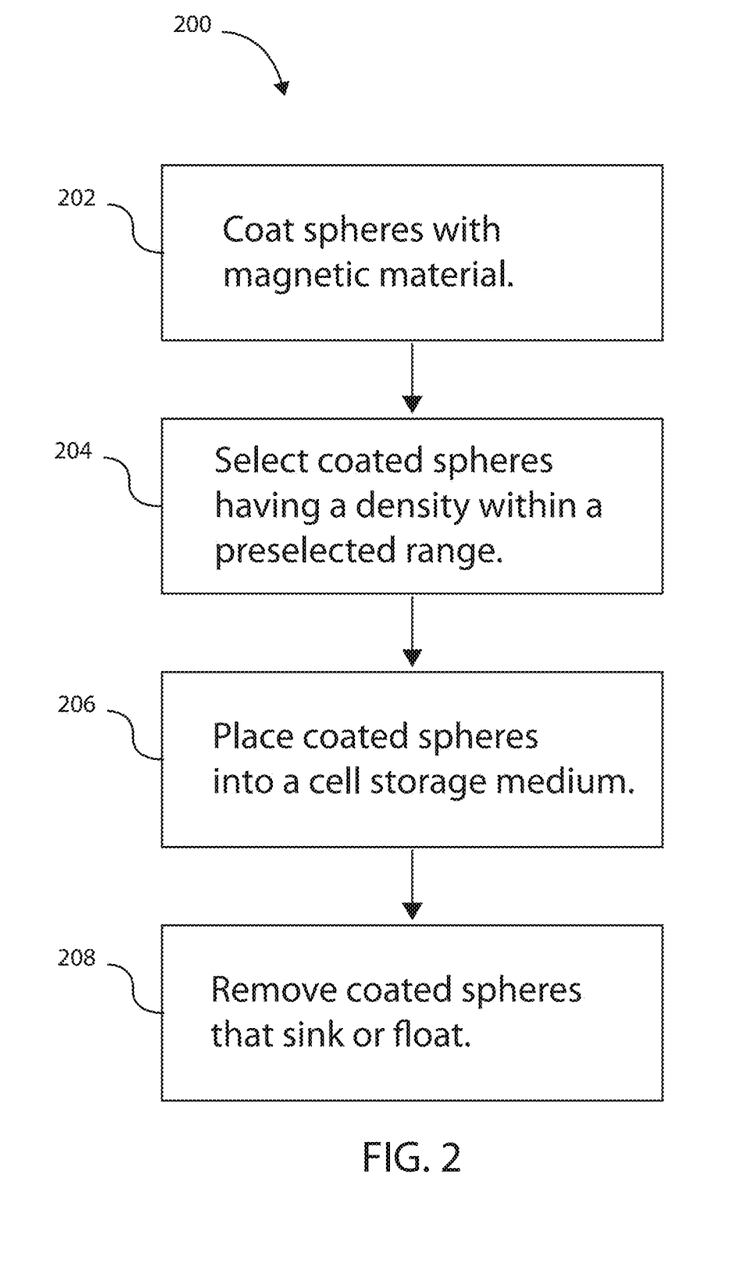
FIG. 2 is a schematic view of a method for creating particles in accordance with various embodiments herein.

Referring now to FIG. 2, a schematic view of a method 200 for creating particles for use in cryopreservation of cell samples is shown in accordance with the embodiments herein. The method 200 can include coating a plurality of spheres with a magnetic material at 202. In some embodiments, the spheres can be hollow. In other embodiments, a portion of the spheres, such as a central portion or another portion, can be formed of a material having a lower weight density. In some embodiments, the method can include selecting particles having a weight density falling within a preselected range at 204. In some embodiments, method 200 can further include placing the particles in a cell storage medium at 206 and removing any particles that sink or float at 208. In certain embodiments, the particles can have two distinct regions, where at least one of the two regions has a density lower than 1 g/cm$^3$. It will be appreciated that references to "spheres" herein do not require the objects to be perfectly spherical unless the context dictates otherwise. In some embodiments, spheres herein can be semi-spherical particles.

Figure 3A:
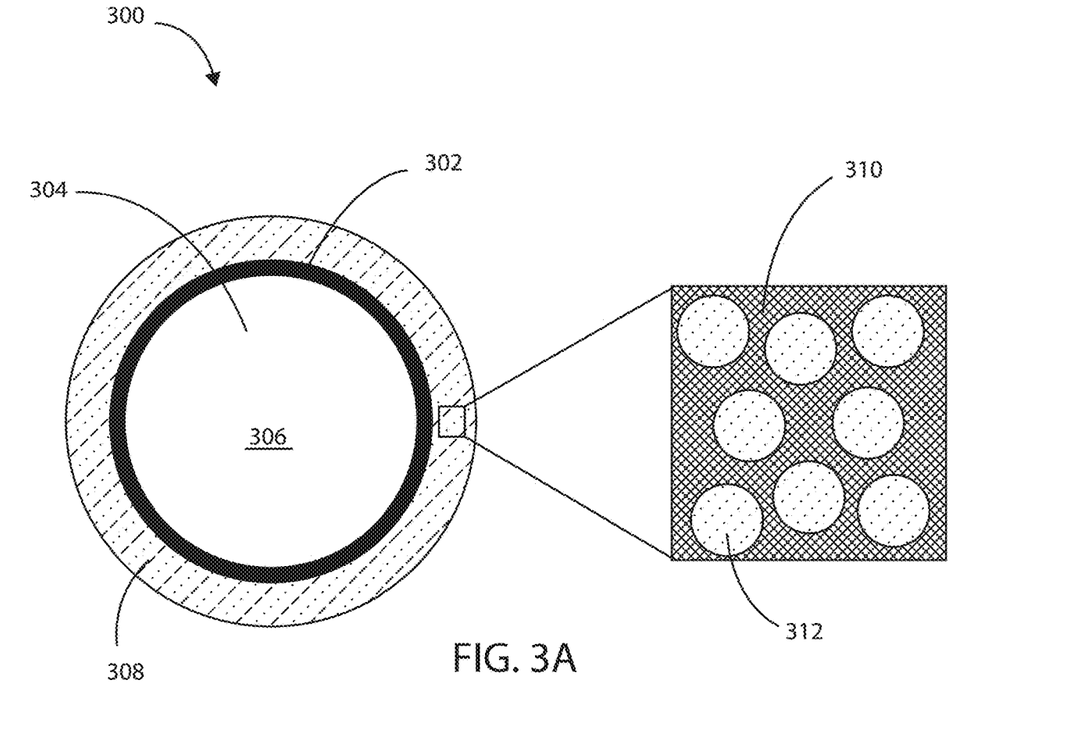
FIG. 3A is a schematic view of a particle in accordance with various embodiments herein.

Referring now to FIG. 3A, a schematic view of a particle 300 is shown in accordance with the embodiments herein. The particle 300 can include a hollow sphere 304. The hollow sphere 304 can include an outer shell 302 surrounding a hollow core 306. However, in some embodiments, the core 306 is not hollow, but filled with a material having a relatively low weight-density either intrinsically or because of a degree of porosity. The particle 300 can include a magnetic layer 308 coated onto an outside surface of the outer shell 302. The magnetic layer 308 can be coated onto an outside surface of the outer shell 302 and can include magnetic material 312 embedded in a polymeric matrix 310.

The particle 300 can have a diameter of from 50 micrometers (μm) to 5 millimeters (mm). In some embodiments, the diameter of the particle(s) 300 can be from 50 μm, 60 μm, 70 μm, 80 μm, 90 μm, 100 μm, 125 μm, 150 μm, 175 μm, 200 μm, 225 μm, 250 μm, 275 μm, 300 μm, 325 μm, 350 μm, 375 μm, 400 μm, 425 μm, 450 μm, 475 μm, 500 μm, 525 μm, 550 μm, 575 μm, 600 μm, 625 μm, 650 μm, 675 μm, 700 μm, 725 μm, 750 μm, 775 μm, 800 μm, 825 μm, 850 μm, 875 μm, 900 μm, 925 μm, 950 μm, 975 μm, 1 mm, 1.25 mm, 1.5 mm, 1.75 mm, 2 mm, 2.25 mm, 2.5 mm, 2.75 mm, 3 mm, 3.25 mm, 3.5 mm, 3.75 mm, 4 mm, 4.25 mm, 4.5 mm, 4.75 mm, 5 mm. It will be appreciated that the diameter of the particles 300 can fall within a range, wherein any of the forgoing diameters can serve as the lower or upper bound of the range, provided that the lower bound of the range is a value less than the upper bound of the range.

Spheres suitable for use to create the particles 300 described herein can be formed from a number of materials. In some embodiments, the spheres can be formed from a biocompatible material. Suitable materials can include, but not be limited to, glass and polymeric materials. In some embodiments the spheres can be made from a nano-porous material. Spheres will be described in more detail below.

Figure 3B:
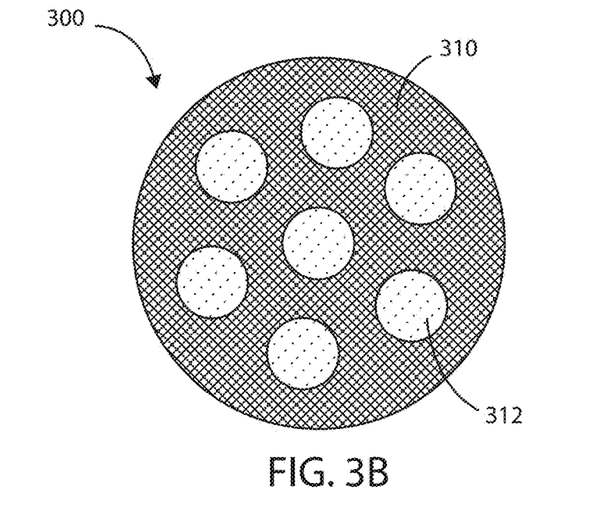
FIG. 3B is a schematic view of a particle in accordance with various embodiments herein.

Particles herein can take on many different forms. Referring now to FIG. 3B, a schematic view of a particle 300 is shown in accordance with the embodiments herein. In this embodiment, the particle 300 can include a relatively low-density matrix, such as a polymeric matrix 310 as a continuous phase, along with magnetic material 312 particles embedded therein.

The particles 300 can be included in a cell storage medium used for cryopresevation of a cell sample. As discussed above, some embodiments herein can include selecting particles 300 having a density falling within a preselected range. In some embodiments, the particles 300 can be selected by placing the particles 300 into a cell storage medium and removing all or a portion of particles that sink or float.

Figure 4:
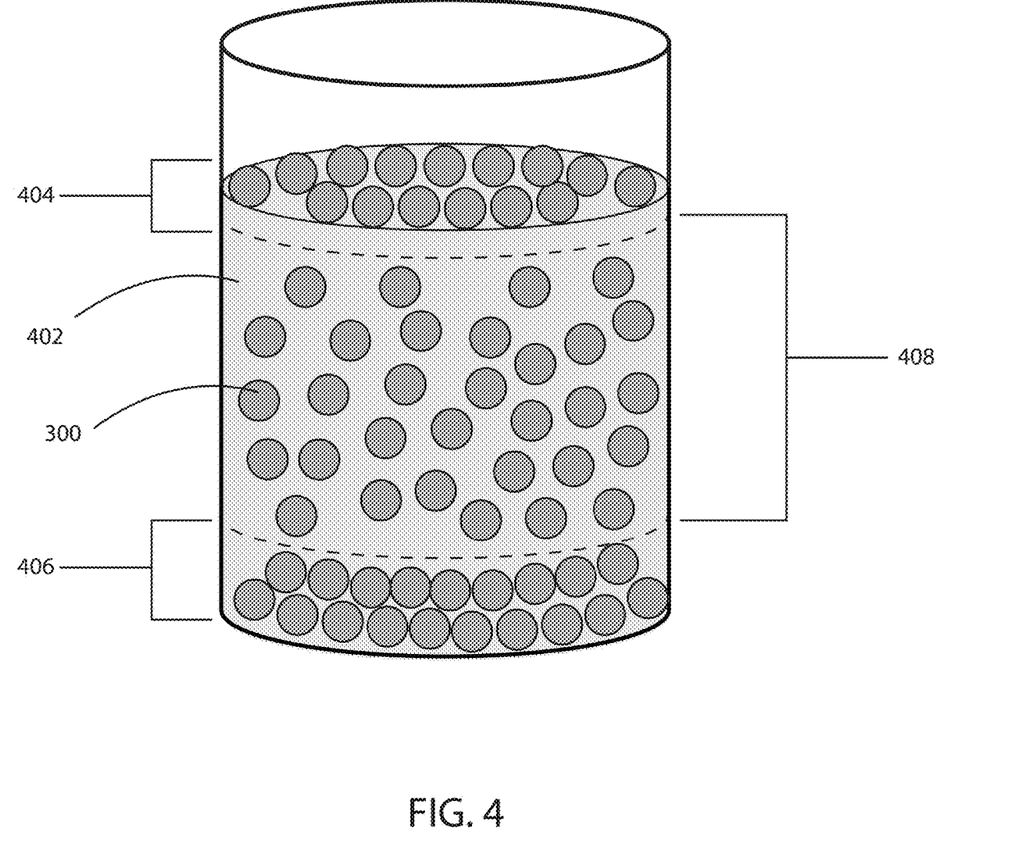
FIG. 4 is a schematic view of a mixture including a cell storage medium for cryopreservation in accordance with various embodiments herein.

By way of example, FIG. 4 shows a schematic view of a mixture including a cell storage medium 402 for cryopreservation of a cell sample in accordance with various embodiments herein. Particles 300 can be placed into the cell storage medium 402, stirred to create a mixture, and allowed to become distributed within the cell storage medium 402. In some embodiments, all or a portion of the particles 300 that float to the top of the cell storage medium 402, shown as particles 300 in region 404, can be removed by skimming them off the top of the cell storage medium 402. In some embodiments, all or a portion of the particles 300 that sink to the bottom of the cell storage medium 402, shown as particles 300 in region 406, can be removed by siphoning them off the bottom of the cell storage medium 402. The distribution of particles 300 that remain suspended in region 408 can be left in the cell storage medium 402 for use in cryopreservation of a cell sample. It will be appreciated, however, that various other techniques can be used to select and/or isolate particles having a particular weight density or having a weight density falling within a particular range.

As used herein, the terms "cell storage medium" and "cell storage media" are equivalent, where the former refers to the singular, "medium," and the latter refers to the plural, "media." Cell storage media in accordance with the embodiments herein will be described more fully below.

In some embodiments, the density of the individual particles can determine the distribution of the particles within the cell storage medium. In some embodiments, the density of the individual particles can be from 0.5 g/cm$^3$ to 1.5 g/cm$^3$. In some embodiments, the density of the particles can be from 0.8 g/cm$^3$ to 1.2 g/cm$^3$. In some embodiments, the particles can have a density of 0.5 g/cm$^3$, 0.6 g/cm$^3$, 0.7 g/cm$^3$, 0.8 g/cm$^3$, 0.9 g/cm$^3$, 1.0 g/cm$^3$, 1.1 g/cm$^3$, 1.2 g/cm$^3$, 1.3 g/cm$^3$, to 1.4 g/cm$^3$, or 1.5 g/cm$^3$. It will be appreciated that the density of the individual particles can fall within a range, wherein any of the forgoing densities can serve as the lower or upper bound of the range, provided that the lower bound of the range is a value less than the upper bound of the range. In some embodiments, the range of individual densities suitable for the particles herein can include the density of a cell storage medium.

Figure 5:
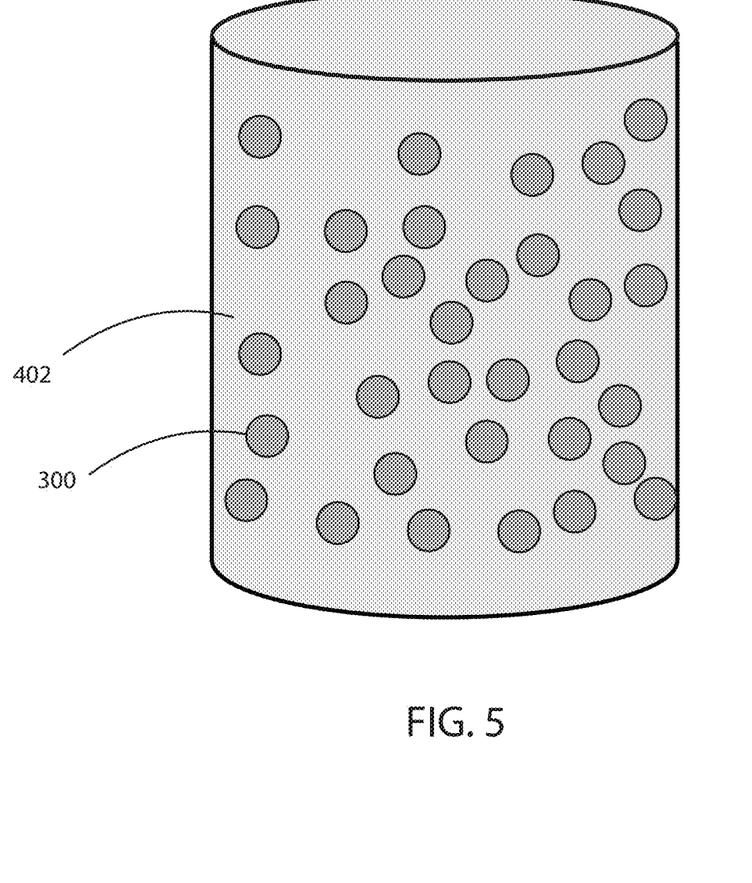
FIG. 5 is a schematic view of a mixture including a cell storage medium for cryopreservation in accordance with various embodiments herein.

Removal of the particles 300 that either float or sink, can result in a cell storage medium that contains a plurality of particles that have a density within a preselected density range. Referring now to FIG. 5, a schematic view of a cell storage medium 402 for cryopreservation is shown in accordance with various embodiments herein. Cell storage medium 402 includes a plurality of particles 300 including a magnetic material. The plurality of particles 300 are shown distributed throughout the cell storage medium 402. In some embodiments, the density of the particles 300 can match the density of the cell storage medium 402. In some embodiments, the density of the particles 300 can fall within a range of densities, as described above.

In some embodiments, a cryoprotective agent can be added to the cell storage media described herein. Cryoprotective agents can prevent the formation of ice crystals within a cell population during the freezing process and while in a frozen state. In some embodiments, the cryoprotective agent can be selected from polyols and sugars. In some embodiments, the cryoprotective agent can include, but not be limited to, dimethylsulfoxide (DMSO), glycerol, sucrose, trehalose, dextrose, propylene glycol, ethylene glycol, polyethylene glycol (PEG), polyvinylpyrrolidone (PVP), nanocellulose, and methylcellulose, or derivatives thereof. In some embodiments, the cryoprotectant can include intracellular agents that can penetrate to the inside the cell to prevent the formation of ice crystals within the cell, and thus cell lysis. In other embodiments, the cryoprotectant can include extracellular agents that maintain an osmotic balance in the cell storage medium during freezing. In some embodiments, both intracellular and extracellular cryoprotectant can be used in the cell storage media described herein.

Figure 6:
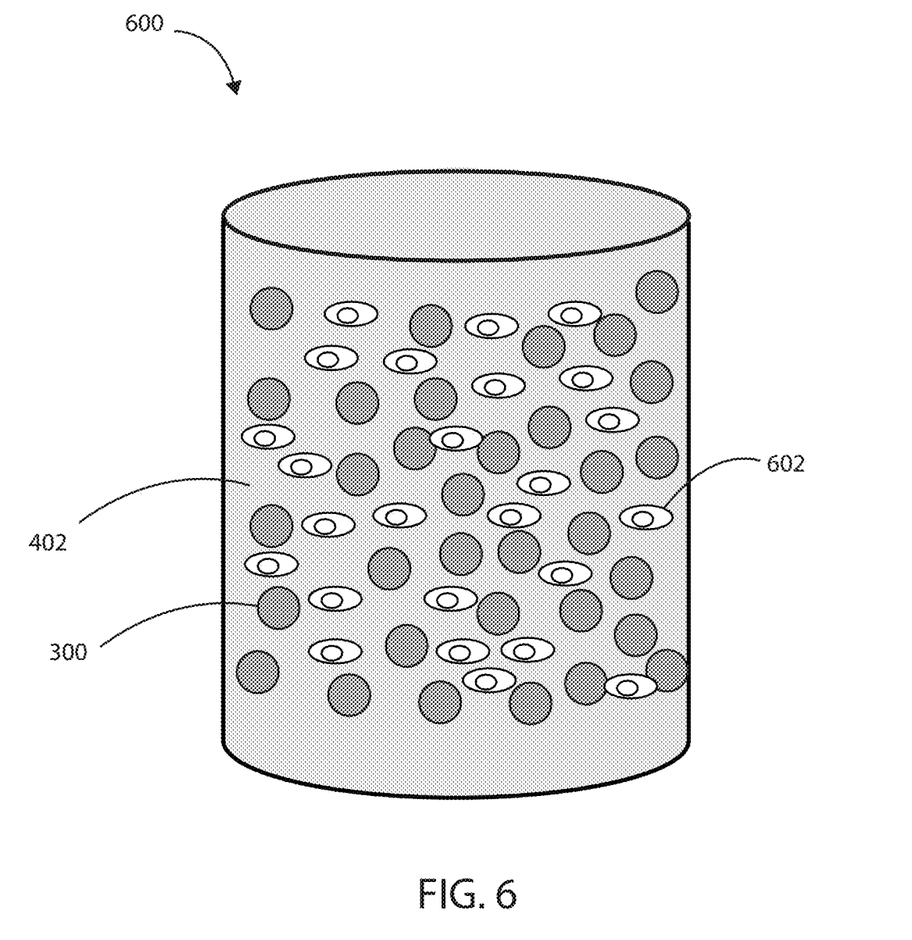
FIG. 6 is a schematic view of a frozen cell sample in accordance with various embodiments herein.

The cell storage media discussed herein are suitable for use in the cryopreservation of a frozen cell sample. Referring now to FIG. 6, a schematic view of a frozen cell sample 600 is shown in accordance with various embodiments herein. Frozen cell sample 600 can include a plurality of cells 602, cell storage medium 402, and a plurality of particles 300 that include a magnetic material. In some embodiments, the frozen cell sample 600 can include stem cells, where the stem cells can include many stem cell types, including hematopoietic stem cells and mesenchymal stem cells. In other embodiments, the frozen cell sample 600 can include epithelial cells, cardiomyocytes, myocytes, neurons, blood cells, endocrine cells, brain cells, glial cells, adipocytes, or germ cells. The frozen cell sample can include cells at a density of anywhere from $2\times10^4$ cells/ml or lower to $2\times10^8$ cells/ml or higher.

In some embodiments, the ratio of particles to cells in a frozen cell sample can be at least 0.01:1, at least 0.1:1, at least 0.25:1, at least 0.5:1, at least 1:1, or at least 2:1; or falling within a range between any of the foregoing. In some embodiments, the particles can have an average particle size at least 10% larger in diameter than the average size of the cells in a population of cells to be frozen in the cell culture medium. In some embodiments, the particles can have an average particle size at least 20%, 30%, 40%, 50%, or 60% larger in diameter than the average size of the cells in a population of cells to be frozen in the cell culture medium. It will be appreciated that the particles can have an average particle size larger in diameter than the average size of the cells that can fall within a range, wherein any of the forgoing percentages can serve as the lower or upper bound of the range, provided that the lower bound of the range is a value less than the upper bound of the range.

To thaw a frozen cell sample, one can approximate the specific heat capacity, or the amount of heat needed to raise the temperature of a specific substance in a specific form by one degree Celsius, for frozen water is about 2.108 J/g·°C. In some embodiments, a frozen cell sample can largely be made up of water; thus, it will be appreciated that the frozen cell sample will have approximately the same heat capacity as frozen water. As such, any combination of magnetic material, particle size, particle mixture, magnetic field strength, and frequency can be used to thaw a frozen cell sample.

It will be appreciated that the particles 300 can include those having a diameter of from 50 micrometers (μm) to 5 millimeters (mm), as discussed above. In some embodiments, the total combined surface area of the particles within a frozen cell sample can range from 1.0 $mm^2$/ml to 500 $mm^2$/ml. In some embodiments, the total combined surface area of the particles within a frozen cell sample can range from 10 $mm^2$/ml to 200 $mm^2$/ml. In some embodiments, the total combined surface area of particles within a frozen cell sample can be about 1.0 $mm^2$/ml, 2.0 $mm^2$/ml, 3.0 $mm^2$/ml, 4.0 $mm^2$/ml, 5.0 $mm^2$/ml, 6.0 $mm^2$/ml, 7.0 $mm^2$/ml, 8.0 $mm^2$/ml, 9.0 $mm^2$/ml, 10 $mm^2$/ml, 20 $mm^2$/ml, 30 $mm^2$/ml, 40 $mm^2$/ml, 50 $mm^2$/ml, 60 $mm^2$/ml, 70 $mm^2$/ml, 80 $mm^2$/ml, 90 $mm^2$/ml, 100 $mm^2$/ml, 200 $mm^2$/ml, 300 $mm^2$/ml, 400 $mm^2$/ml, or 500 $mm^2$/ml, or can fall within a range between any of the foregoing. It will be appreciated that the total combined surface area of the particles within a frozen cell sample can fall within a range, wherein any of the forgoing surface areas can serve as the lower or upper bound of the range, provided that the lower bound of the range is a value less than the upper bound of the range.

The volume percentage (vol. %) of the particles within a frozen cell sample fall within a range of densities. In some embodiments, the density of the particles within a frozen cell sample can be from 0.01 vol. % to 2.0 vol. %. In some embodiments, the density of the particles within a frozen cell sample can be from 0.02 vol. % to 1.0 vol. %. In some embodiments, the particles can be present at a density of 0.01 vol. %, 0.02 vol. %, 0.03 vol. %, 0.04 vol. %, 0.05 vol. %, 0.06 vol. %, 0.07 vol. %, 0.08 vol. %, 0.09 vol. %, 0.10 vol. %, 0.20 vol. %, 0.30 vol. %, 0.40 vol. %, 0.50 vol. %, 0.60 vol. %, 0.70 vol. %, 0.80 vol. %, 0.90 vol. %, 1.0 vol. %, 1.1 vol. %, 1.2 vol. %, 1.3 vol. %, 1.4 vol. %, 1.5 vol. %, 1.6 vol. %, 1.7 vol. %, 1.8 vol. %, 1.9 vol. %, 2.0 vol. %, 3.0 vol. %, 5.0 vol. %, 7.5 vol. %, 10.0 vol. %, 15.0 vol. %, 20.0 vol. %, 25.0 vol. %, 30.0 vol. %, or 40.0 vol. %. It will be appreciated that the volume percentage of the particles within a frozen cell sample can fall within a range, wherein any of the forgoing volume percentages can serve as the lower or upper bound of the range, provided that the lower bound of the range is a value less than the upper bound of the range.

Figure 7:
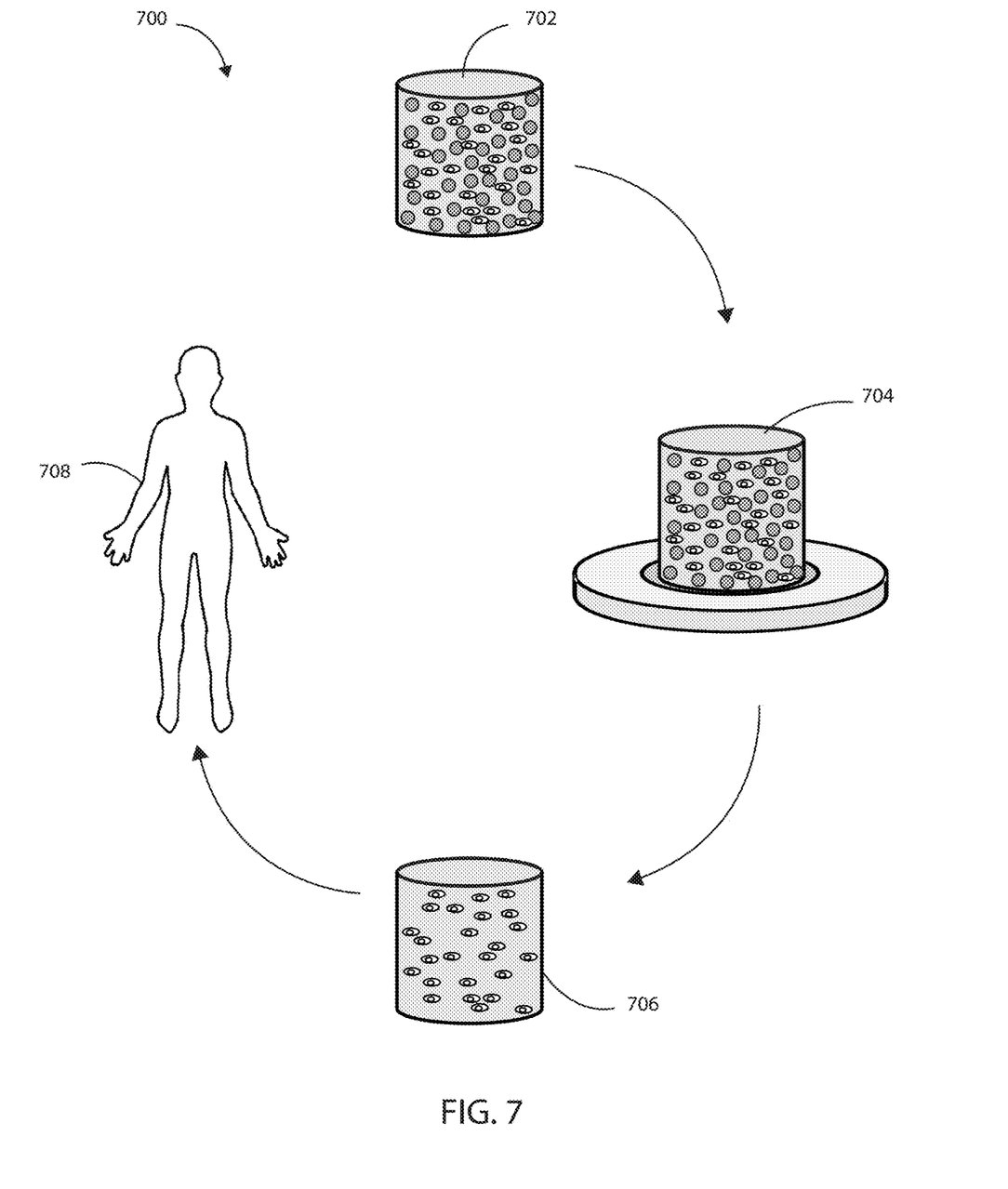
FIG. 7 is a schematic view of a method for treating a patient in accordance with various embodiments herein.

The frozen cell samples and methods herein can be used for treating a patient, such as treating a patient undergoing cell replacement therapy. Referring now to FIG. 7, a schematic view of a method 700 for treating a patient is shown in accordance with various embodiments herein. The method 700 can include obtaining a frozen cell sample including particles at 702, where the particles include a magnetic material. The method 700 can include applying an alternating electromagnetic field to the frozen cell sample to induce heating of the magnetic material at 704. In some embodiments, the method can include removing the particles from the frozen cell sample once it is thawed at 706 using various techniques including, but not limited to, filtration. In some embodiments, the method can include injecting the thawed cell sample into a patient at 708. It will be appreciated that the term "injecting" as used herein shall include the technique of infusion. In some embodiments, the therapy can include treating a patient undergoing stem cell replacement therapy. In some embodiments, the stem cell replacement therapy can include stem cell replacement therapy using hematopoietic stem cells and/or mesenchymal stem cells.

Magnetic Materials

Magnetic materials suitable for use herein can include ferromagnetic, antiferromagnetic, ferrimagnetic, and paramagnetic materials. Magnetism within metals and other magnetic materials can be attributed to the spins of unpaired electrons within atomic orbitals of those materials and the alignment of the unpaired electrons to one another. The spin of an individual electron can create a magnetic dipole moment about that electron, which produces a small magnetic field. In a given magnetic material, many smaller individual magnetic fields generated by individual electrons can be added together to create a larger collective magnetic field.

Ferromagnetic materials can include materials where the spins of the unpaired electrons are aligned in a parallel configuration. Antiferromagnetic materials can include materials where the spins of the unpaired electrons are aligned in an antiparallel configuration where the magnetic moments of neighboring spins cancel one another. Ferrimagnetic materials can include materials where the spins of the unpaired electrons are aligned in an antiparallel configuration where the magnetic moments of neighboring spins do not cancel one another. Paramagnetic materials can include materials where the spins of the unpaired electrons are randomly oriented.

Most magnetic materials are paramagnetic above a critical temperature, where thermal energy disrupts the interaction between the spins of the unpaired electrons. At certain temperatures, the ferromagnetic, antiferromagnetic, and ferrimagnetic materials undergo a phase transition where they become paramagnetic as the electron spins become randomly oriented. Ferromagnetic materials transition from the ferromagnetic phase to the paramagnetic phase above the Curie-temperature. Similarly, ferrimagnetic and antiferromagnetic materials transition from the ferrimagnetic phase and the antiferromagnetic phase, respectively, to the paramagnetic phase above the Néel temperature.

Figure 8:
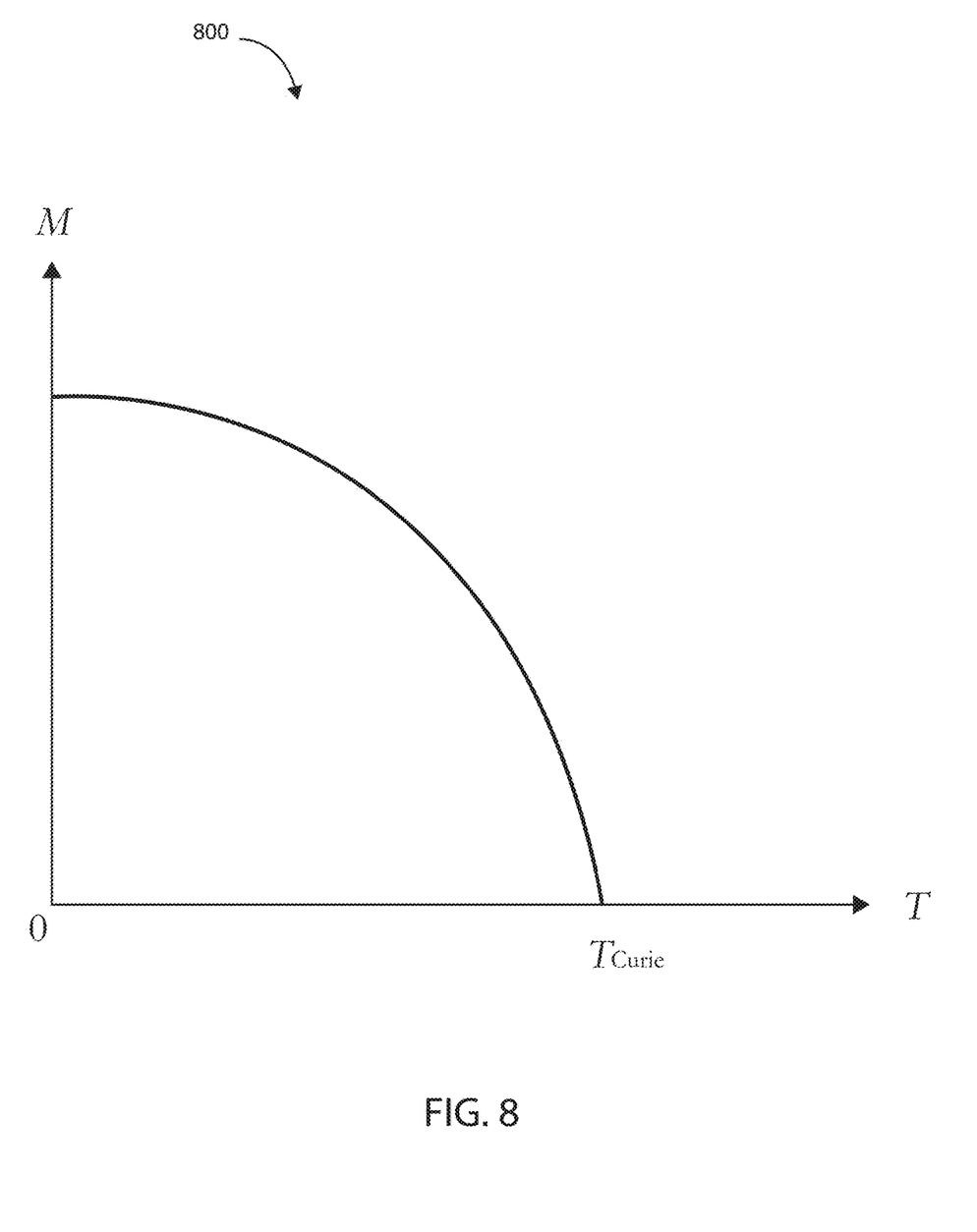
FIG. 8 is a schematic plot of magnetism versus absolute temperature for a Curie-magnetic material in accordance with various embodiments herein.

Curie's Law provides that for any given paramagnetic material, magnetization is directly proportional to an applied external magnetic field and inversely proportional to the absolute temperature in Kelvins. A given ferromagnetic substance will have an associated Curie Temperature ($T_{Curie}$), or the point above which a ferromagnetic material loses its magnetic properties. As such, ferromagnetic materials are paramagnetic above their Curie temperatures and ferromagnetic below their Curie temperatures. Referring now to FIG. 8, a schematic plot 800 of magnetism versus absolute temperature for a Curie-magnetic material is shown in accordance with various embodiments herein. Plot 800 shows the relationship between magnetism (M) and temperature (T) for a Curie-magnetic material having a given Curie temperature. FIG. 8 shows that as the temperature increases, the Curie-magnetic material, such as a ferromagnetic material, loses magnetization. At the Curie temperature, the Curie-magnetic material transitions from a ferromagnetic material to a paramagnetic material.

Figure 9:
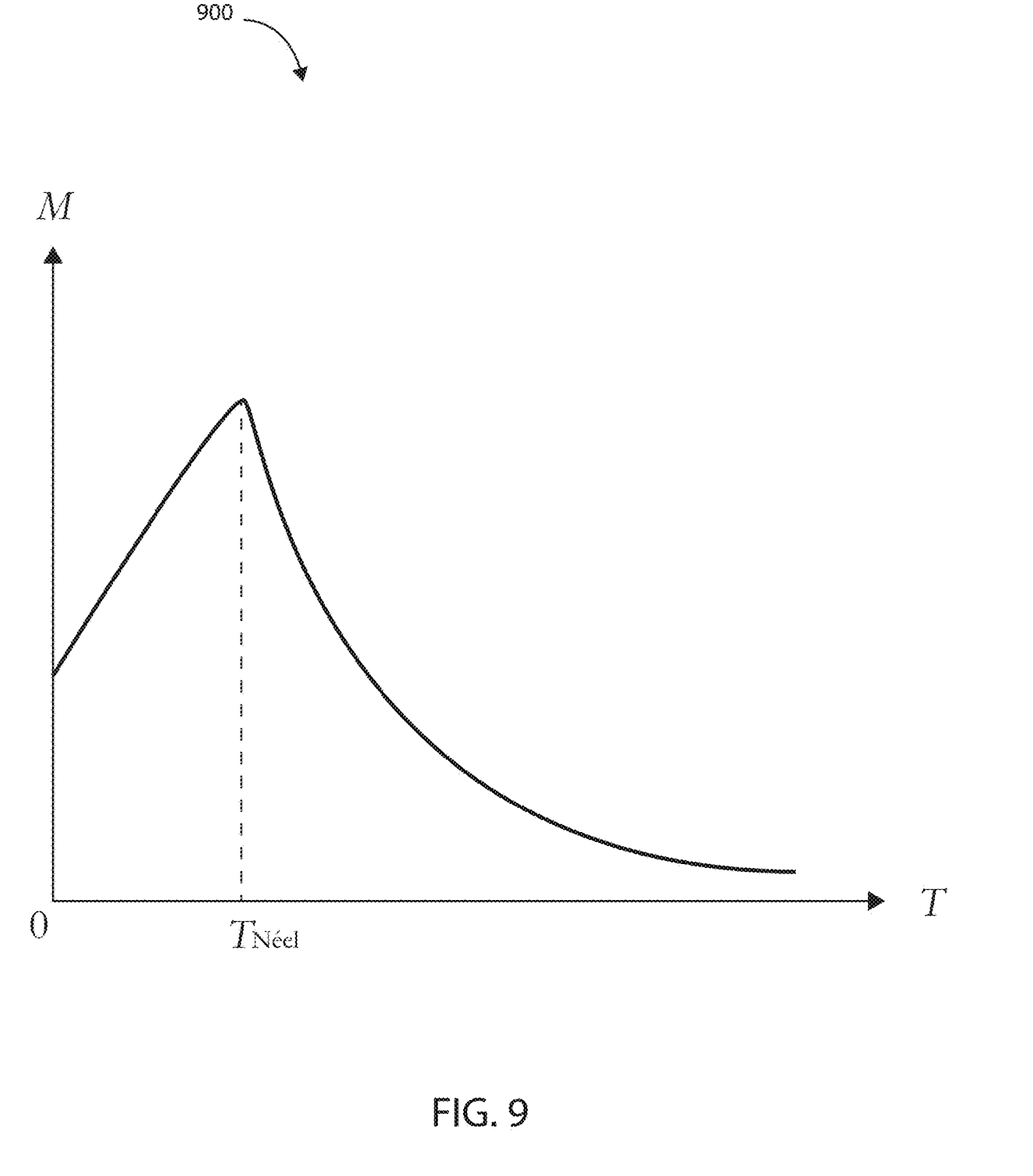
FIG. 9 is a schematic plot of magnetism versus absolute temperature for a Néel-magnetic material in accordance with various embodiments herein.

Similar to the Curie temperature, the Néel temperature is the point above which a ferrimagnetic or an antiferromagnetic material starts to become paramagnetic. Referring now to FIG. 9, a schematic plot of magnetism versus absolute temperature for a Néel-magnetic material is shown in accordance with various embodiments herein. Plot 900 shows the relationship between magnetism (M) and temperature (T) for a Néel-magnetic material having a given Néel temperature. For a Néel-magnetic material, magnetism reaches a maximum at the Néel temperature ($T_{Néel}$), and magnetism is smaller below the Néel temperature and above the Néel temperature. Above the Néel temperature, antiferromagnetic and ferrimagnetic materials transition into paramagnetic materials.

It will be appreciated that different materials can be blended, alloyed, mixed or otherwise combined to have a desired average Curie Temperature or Néel Temperature. The Curie-magnetic materials herein can include those with a weight average Curie temperature of 10 degrees Celsius to 45 degrees Celsius. In some embodiments, the Curie-magnetic materials herein can include those with a weight average Curie temperature of 20 degrees Celsius to 40 degrees Celsius. In some embodiments, the Curie-magnetic materials herein can include those with a weight average Curie temperature of 50 degrees Celsius to 350 degrees Celsius. In some embodiments, the Curie-magnetic materials herein can include those with a weight average Curie temperature of 10 degrees Celsius, 15 degrees Celsius, 20 degrees Celsius, 25 degrees Celsius, 30 degrees Celsius, 35 degrees Celsius, 40 degrees Celsius, 45 degrees Celsius, 50 degrees Celsius, 100 degrees Celsius, 150 degrees Celsius, 200 degrees Celsius, 250 degrees Celsius, 300 degrees Celsius, 350 degrees Celsius, 400 degrees Celsius, 450 degrees Celsius, or 500 degrees Celsius. It will be appreciated that the Curie-magnetic materials herein can include those with a weight average Curie temperature that can fall within a range, wherein any of the forgoing temperatures can serve as the lower or upper bound of the range, provided that the lower bound of the range is a value less than the upper bound of the range. In some embodiments, the Curie-magnetic materials herein can include those with a weight average Curie temperature greater than 500 degrees Celsius.

The Néel-magnetic materials herein can include those with a weight average Néel temperature of 10 degrees Celsius to 45 degrees Celsius. In some embodiments, the Néel-magnetic materials herein can include those with a weight average Néel temperature of 20 degrees Celsius to 40 degrees Celsius. In some embodiments, the Néel-magnetic materials herein can include those with a weight average Néel temperature of 50 degrees Celsius to 350 degrees Celsius. In some embodiments, the Néel-magnetic materials herein can include those with a weight average Néel temperature of 10 degrees Celsius, 15 degrees Celsius, 20 degrees Celsius, 25 degrees Celsius, 30 degrees Celsius, 35 degrees Celsius, 40 degrees Celsius, 45 degrees Celsius, 50 degrees Celsius, 100 degrees Celsius, 150 degrees Celsius, 200 degrees Celsius, 250 degrees Celsius, 300 degrees Celsius, 350 degrees Celsius, 400 degrees Celsius, 450 degrees Celsius, or 500 degrees Celsius. It will be appreciated that the Néel-magnetic materials herein can include those with a weight average Néel temperature that can fall within a range, wherein any of the forgoing temperatures can serve as the lower or upper bound of the range, provided that the lower bound of the range is a value less than the upper bound of the range. In some embodiments, the Néel-magnetic materials herein can include those with a weight average Néel temperature greater than 500 degrees Celsius.

The magnetic materials herein can be utilized during volumetric heating as an automatic heat control mechanism to create a set point for the temperature within a volume of a cell sample during thawing. For example, the Curie temperature and/or the Néel temperature can be selected (either by picking a particular magnetic material having the desired value or by combining multiple materials to arrive at a desired average value) to create a set point for the temperature during thawing. Volumetric heating of a frozen cell sample can be achieved using Curie-magnetic materials and Néel-magnetic materials incorporated throughout the frozen cell sample. In some embodiments, one Curie-magnetic material or Néel-magnetic material can be incorporated throughout the frozen cell sample or cell freezing medium. In other embodiments, more than one Curie-magnetic material or Néel-magnetic material can be incorporated throughout the frozen cell sample, or cell freezing medium, where each of the more than one Curie-magnetic material or Néel-magnetic material has a unique Curie temperature or Néel temperature. In some embodiments, a nanocomposite magnetic material created from two or more magnetic materials each having different a Curie temperature or Néel temperature can be used to tune the Curie temperature or Néel temperature to higher or lower values than would be expected from any of the two or more magnetic materials alone.

Exemplary nanocomposite magnetic materials can include two or more magnetic materials. In some embodiments, the nanocomposite magnetic materials can include three, four, five, or six different magnetic materials. By way of example, a nanocomposite material can be created from two magnetic materials, for example magnetic material A and magnetic material B. In this example, the Curie temperature (or alternatively the Néel temperature) of magnetic material A is different than the Curie temperature (or alternatively the Néel temperature) of magnetic material B.

The ratio of magnetic material A to magnetic material B in a nanocomposite magnetic material can fall within a range of 1 weight percent (wt. %) to 99 wt. %. In some embodiments, the ratio of magnetic material A to magnetic material B in a nanocomposite magnetic material can include a ratio of 50 wt. % to 50 wt. %. In some embodiments, the ratio of magnetic material A to magnetic material B in a nanocomposite magnetic material can include a ratio of 99 wt. % to 1 wt. %. In some embodiments, the ratio of magnetic material A to magnetic material B in a nanocomposite magnetic material can include a range of ratios including 1:99, 10:90, 20:80, 30:70, 40:60, 50:50, 60:40, 70:30, 80:20, 90:10, or 99:1. It will be appreciated that the ratio of magnetic material A to magnetic material B in a nanocomposite magnetic material can include those that can fall within a range, wherein any of the forgoing ratios can serve as the lower or upper bound of the range, provided that the lower bound of the range is a value less than the upper bound of the range.

The magnetic materials herein can include magnetic nanoparticles and magnetic microparticles. In some embodiments, the magnetic materials herein can include a mixture of one or more magnetic nanoparticles. In some embodiments, the magnetic materials herein can include a mixture of one or more magnetic microparticles. In some embodiments, the magnetic materials herein can include a mixture of one or more magnetic nanoparticles and one or more magnetic microparticles.

Magnetic nanoparticles can include, but not be limited to particles having a diameter from 0.1 nm to 100 nanometers (nm) in size. In some embodiments, the magnetic nanoparticles can include those having a diameter of 1 nm, 2 nm, 3 nm, 4 nm, 5 nm, 6 nm, 7 nm, 8 nm, 9 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, or 100 nm. It will be appreciated that the diameter of the magnetic nanoparticles can fall within a range, wherein any of the forgoing diameters can serve as the lower or upper bound of the range, provided that the lower bound of the range is a value less than the upper bound of the range.

Similarly, the magnetic microparticles can include, but not be limited to particles having a diameter from 100 nm to 500 μm in size. In some embodiments, the magnetic microparticles can include, but not be limited to particles having a diameter from 100 nm to 100 μm in size. In some embodiments, the magnetic nanoparticles can include those having a diameter of 100 nm, 200 nm, 300 nm, 400 nm, 500 nm, 600 nm, 700 nm, 800 nm, 900 nm, 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 125 μm, 150 μm, 175 μm, 200 μm, 225 μm, 250 μm, 275 μm, 300 μm, 325 μm, 350 μm, 375 μm, 400 μm, 425 μm, 450 μm, 475 μm, 500 μm, 600 μm, or 700 μm. It will be appreciated that the diameter of the magnetic microparticles can fall within a range, wherein any of the forgoing diameters can serve as the lower or upper bound of the range, provided that the lower bound of the range is a value less than the upper bound of the range.

Magnetic materials suitable for use herein can include, but not be limited to gadolinium, chromium (IV) oxide, iron (III) oxide, cerium, praseodymium, lanthanum, samarium, erbium, nickel, manganese, dysprosium, yttrium, samarium-cobalt magnet, terfenol-D, magnetite, or any alloys or derivatives thereof. In some embodiments, a stainless steel grade 430 (i.e., SUS430) alloy including addition additives, such as aluminum and dysprosium, gadolinium, samarium, yttrium, or combinations thereof can be used. In particular, in some embodiments, an SUS430 alloy with 11.7 wt. % aluminum and 0.3 wt. % samarium (having a $T_{Curie}$ of 300 degrees Celsius), can be used. Additional magnetic materials suitable for use herein can include organic Curie materials, such as graphene and derivatives thereof, and nanoglasses.

Some exemplary magnetic materials include alloys having the general formula of $R_2NiMnO_6/La_2NiMnO_6$ superlattices where R is a rare-earth metal. Rare earth metals suitable for use can include any one or more of the following: scandium (Sc), Yttrium (Y), Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu). In some embodiments, the magnetic materials can include $Ce_2NiMnO_6/La_2NiMnO_6$, $Pr_2NiMnO_6/La_2NiMnO_6$, $Sm_2NiMnO_6/La_2NiMnO_6$, $Er_2NiMnO_6/La_2NiMnO_6$, $La_2NiMnO_6$, $Gd_2NiMnO_6$, or any combination thereof. In some embodiments, the magnetic materials can include those having the general formula $Mg_xZn_{0.3}Cu_{0.7-2x}Fe_{2+x}O_4$, where x=0.10, 0.20, 0.25, 0.30, and 0.35. Additional exemplary magnetic materials suitable for use herein can be found in U.S. Patent Publication Nos. 2003/0163187 and 2015/0297763, the contents of which are hereby incorporated by reference in their entirety.

Spheres

The spheres suitable for use herein can include those that have a density close to the density of the cell freezing media, as described above, to allow for their even distribution within the medium so that they do not sink of float. As such, spheres can be chosen to fall within a preselected range of densities. In some embodiments, the spheres can be hollow. In other embodiments, the spheres can be non-hollow. In some embodiments, the spheres can be porous. In some embodiments, the spheres can include two or more regions (or phases) having different weight densities.

As described above, spheres can be coated with a magnetic material and a polymer to form the particles used herein. Spheres themselves can be created from a polymeric material. In some embodiments, the spheres can be created from a biocompatible polymeric material. In some embodiments, the spheres can be created from a glass material. In some embodiments, the spheres can be created from biocompatible nanoglasses.

Suitable polymeric materials can include, but not be limited to polymers such as polyvinylchloride, polytetrafluoroethylene, polyethersulfone, polyethylene, polyetheretherketone (PEEK), polysulfone, polypropylene, polypropylene oxide, polylactic acid, polyethylene glycol, polystyrene, polyvinyl alcohol, and combinations or derivatives thereof. In some embodiments, co-polymers of any of the above biocompatible polymers can be used.

Coating Methods

The particles herein can be created by coating the spheres with magnetic material. In some embodiments, the spheres can be coated such that the magnetic material is embedded in a polymeric matrix. In some embodiments, the polymeric matrix can include a biocompatible polymeric matrix. Exemplary biocompatible polymers suitable for use herein can include, but not be limited to polyvinylchloride, polytetrafluoroethylene, polyethersulfone, polyethylene, polyetheretherketone (PEEK), polysulfone, polypropylene, polypropylene oxide, polylactic acid, polyethylene glycol, polystyrene, polyvinyl alcohol, and combinations or derivatives thereof. In some embodiments, co-polymers of any of the above biocompatible polymers can be used.

In some embodiments, the spheres can be coated using a fluidized bed spray coating process. Spray coating in a fluidized bed system can produce a surface coating through the even application of a film of magnetic material onto the hollow spheres. With this method, hollow spheres can be moved around in the fluidized bed and simultaneously sprayed with a liquid. When the aqueous or organic solution evaporates, the solids left behind can form the magnetic layer on the hollow spheres. Particle sizes suitable for use herein are described above. Additional coating methods can include, but not be limited to powder coating, microencapsulation coating, spray drying, other spraying techniques, and the like.

Aspects may be better understood with reference to the following examples. These examples are intended to be representative of specific embodiments, but are not intended as limiting the overall scope of embodiments herein.

EXAMPLES

Example 1: Determining Particle Combined Surface Area for Thawing a 1 ml Frozen Cell Sample from −70 Degrees Celsius to 0 Degrees Celsius It will be appreciated that the specific heat capacity, or the amount of heat needed to raise the temperature of a specific substance in a specific form by one degree Celsius, for frozen water is about 2.108 J/g·°C. In some embodiments, a frozen cell sample can be largely water; thus, it will be appreciated that a frozen cell sample will have approximately the same heat capacity as frozen water.

The combined surface area of particles having an average diameter of 200 μm was determined for thawing a 1 ml frozen cell sample from −70 degrees Celsius to 0 degrees Celsius in 5 minutes by using 1 ml of water as a model substance. A sphere with an average diameter of 200 μm has an approximate surface area of 0.125 mm$^2$ according to the formula for the surface area of a sphere (i.e., $4\pi r^2 = \pi d^2$, where r is the radius of a sphere and d is the diameter of a sphere). A sphere with an average diameter of 200 μm will have an approximate volume of 0.0042 mm$^3$ according to the formula for the volume of a sphere (i.e., $(4/3)\pi r^3$, where r is the radius of a sphere).

The specific heat capacity of the 1 ml of water is approximately 2.108 J/g·°C. for every 1°C., so to raise the temperature by 70°C. it was determined that 147.42 J/g was required (i.e., 70°C.×2.108 J/g·°C.=147.42 J/g). To thaw the cell sample in 5 minutes, or 300 seconds, it was determined that 0.50 Watts (i.e., (147.42 J/g)/300 sec=0.50 Watts/ml; providing that 1 ml of water is approximately 1 g) was required.

To melt 1 ml of water, 100 of the 200 μm particles are used. The 100 of the 200 μm particles generated approximately 4 W/cm$^2$ to heat the sample, as measured by an external power meter. The surface area of the particles generating heat within the 1 ml of water was determined to be approximately 0.1225 cm$^2$/ml (i.e., (0.50 Watts/ml)/(4 W/cm$^2$)=0.1225 cm$^2$/ml), which is equivalent to a total combined surface area of 12.25 mm$^2$. This measured value was close to the empirical value for total combined surface area of 12.5 mm$^2$. Because each individual particle has an average surface area of 0.125 mm$^2$ and an average volume of about 0.0042 mm$^3$, it was determined that about 100 particles per ml, each having a diameter of 200 μm, are needed to thaw an equivalent frozen cell sample in 5 minutes. Because each particle has an individual volume of 0.0042 mm$^3$, the total combined surface volume for the particles is approximately 0.41 mm$^3$. As such, the volume percentage (vol. %.) of the particles having a 200 μm diameter in a 1 ml sample is 0.41 mm$^3$/1000=0.41 vol. %.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A cell storage medium for cryopreservation comprising:
   i. a cryoprotective agent; and
   ii. a plurality of round particles comprising a Curie-magnetic material or a Néel magnetic material, the Curie-magnetic material comprising a Curie temperature of 10 degrees Celsius to 45 degrees Celsius, and the Néel-magnetic material comprising a Néel temperature of 10 degrees Celsius to 45 degrees Celsius;
   wherein the Curie-magnetic material or the Néel-magnetic material comprises at least two of: gadolinium, chromium (IV) oxide, iron (III) oxide, cerium, praseodymium, lanthanum, samarium, erbium, nickel, manganese, dysprosium, yttrium, samarium-cobalt magnet, terfenol-D, magnetite, graphene, and nanoglasses.

2. The cell storage medium of claim 1, wherein the particles are hollow.

3. The cell storage medium of claim 2, the hollow particles comprising an outer shell, wherein the Curie-magnetic material or the Néel-magnetic material is coated onto an outside surface of the outer shell.

4. The cell storage medium of claim 1, the particles comprising two distinct regions, wherein one of the two regions has a density lower than 1 g/cm$^3$.

5. The cell storage medium of claim 1, the plurality of particles having an average Curie temperature of 10 degrees Celsius to 45 degrees Celsius, or an average Néel temperature of 10 degrees Celsius to 45 degrees Celsius, wherein the average Curie temperature or average Néel temperature is an average temperature value for materials of the particles reflecting the contribution of individual materials therein in proportion to their weight fraction of the overall weight of the particles.

6. The cell storage medium of claim 1, wherein the Curie-magnetic material comprising a Curie temperature of 10 degrees Celsius to 40 degrees Celsius, or the Néel-magnetic material comprising a Néel temperature of 10 degrees Celsius to 40 degrees Celsius.

7. A frozen cell sample comprising:
  i. a plurality of cells;
  ii. a cell storage medium, the cell storage medium comprising
    a cryoprotective agent; and
    a plurality of round particles comprising a Curie-magnetic material or a Néel-magnetic material the Curie-magnetic material comprising a Curie temperature of 10 degrees Celsius to 45 degrees Celsius, and the Néel-magnetic material comprising a Néel temperature of 10 degrees Celsius to 45 degrees Celsius;
  wherein the Curie-magnetic material or the Néel-magnetic material comprises at least two of: gadolinium, chromium (IV) oxide, iron (III) oxide, cerium, praseodymium, lanthanum, samarium, erbium, nickel, manganese, dysprosium, yttrium, samarium-cobalt magnet, terfenol-D, magnetite, graphene, and nanoglasses.

8. The frozen cell sample of claim 7, the frozen cell sample comprising stem cells.

9. The frozen cell sample of claim 7, the plurality of particles having an average Curie temperature of 10 degrees Celsius to 45 degrees Celsius, or an average Néel temperature of 10 degrees Celsius to 45 degrees Celsius, wherein the average Curie temperature or average Néel temperature is an average temperature value for materials of the particles reflecting the contribution of individual materials therein in proportion to their weight fraction of the overall weight of the particles.

10. The frozen cell sample of claim 7, wherein the Curie-magnetic material comprising a Curie temperature of 10 degrees Celsius to 40 degrees Celsius, or the Néel-magnetic material comprising a Néel temperature of 10 degrees Celsius to 40 degrees Celsius.

* * * * *